Jan. 5, 1926.　　　　　　　　　　　　　　　　　　　　1,568,487
A. F. VURPILLAT
RETAINING DEVICE FOR RIM LUGS
Filed July 21, 1925
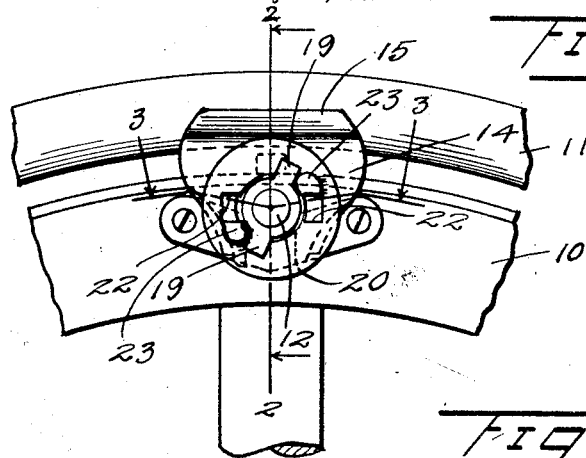
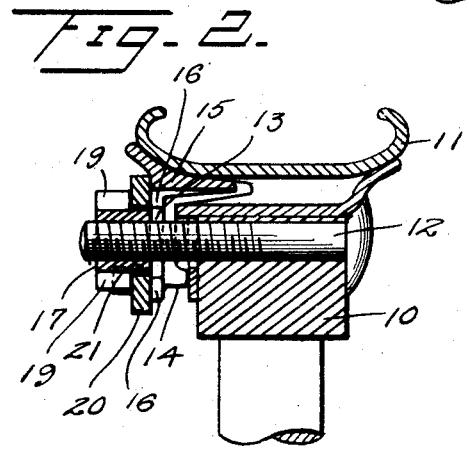
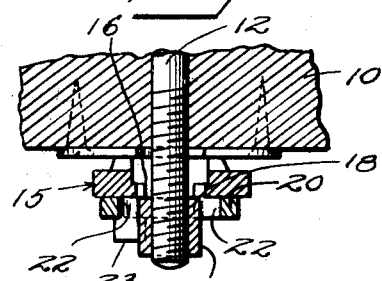
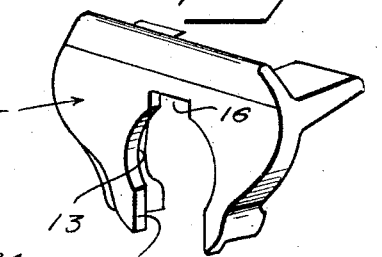
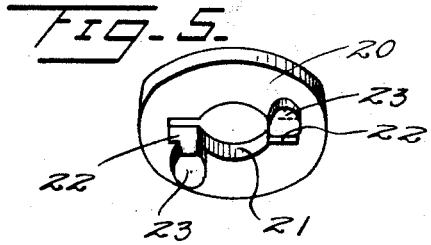
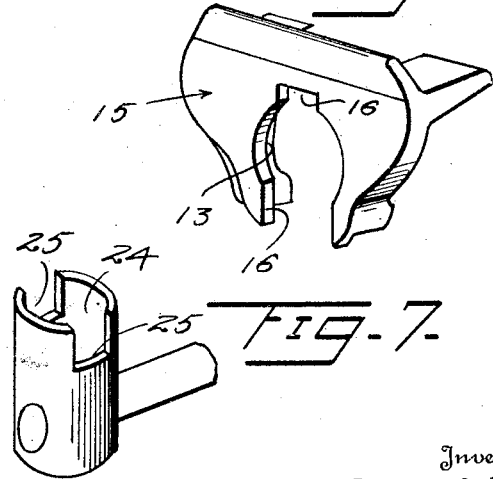
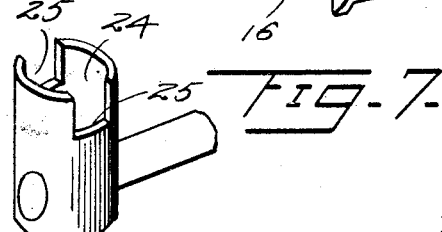
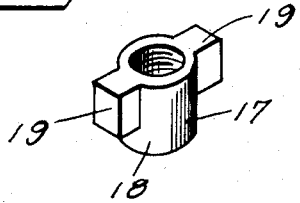
Inventor
A. F. Vurpillat.
By Watson E. Coleman.
Attorney Patented Jan. 5, 1926.

1,568,487

UNITED STATES PATENT OFFICE.

ALBERT F. VURPILLAT, OF FARGO, NORTH DAKOTA.

RETAINING DEVICE FOR RIM LUGS.

Application filed July 21, 1925. Serial No. 45,074.

*To all whom it may concern:*

Be it known that I, ALBERT F. VURPILLAT, a citizen of the United States, residing at Fargo, in the county of Cass and State of North Dakota, have invented certain new and useful Improvements in Retaining Devices for Rim Lugs, of which the following is a specification, reference being had to the accompanying drawings.

This invention relates to retaining devices for rim lugs and has for an important object thereof the provision of a retaining device for the lug from which the lug may be removed without complete removal of the retaining device.

A more specific object of the invention is the provision of a retaining lug and washer therefor in combination with a retaining nut, the nut, washer and lug being so constructed that the washer and lug may be removed over the nut without complete removal of the latter, thereby saving considerable time in releasing a rim for removal from the wheel.

A still further object of the invention is to provide a device of this character which necessitates but little change in the present construction of the lug and in the equipment usually supplied on demountable rim wheels.

More specifically, the invention consists in the provision of a lug with wing slots in combination with a nut having wings alignable with the slots so that the lug may be removed over the nut and further in the provision of a wing slotted washer positioned between the nut and lug so constructed that in tightening of the nut, the nut does not align with the wing slots provided in the washer to become hung therein and in removal of the nut moves this wing slot into alignment with the nut so that when the nut is sufficiently loosened, the washer may be directly moved thereover without the necessity of first aligning the washer with the nut.

These and other objects I attain by the construction shown in the accompanying drawing, wherein for the purpose of illustration is shown a preferred embodiment of my invention and wherein:—

Figure 1 is a fragmentary side elevation of a wheel felly and rim showing a lug attachment constructed in accordance with my invention;

Figure 2 is a section on the line 2—2 of Figure 1;

Figure 3 is a section on the line 3—3 of Figure 1;

Figure 4 is a perspective of the lug;

Figure 5 is a perspective of the washer;

Figure 6 is a perspective of the nut; and

Figure 7 is a perspective of the form of wrench employed.

Referring now more particularly to the drawing, the numeral 10 indicates a wheel felly structure for the reception of a demountable rim 11. This rim is held in position upon the felly by bolts 12 of the usual construction passing through the felly and through an opening 13 formed in the felly engaging flange 14 of the rim lug 15. This rim lug is of the usual construction with the exception of the fact that the opening for the passage of the bolt 12 is of greater size than the bolt and at diametrically opposed points wing slots 16 communicate therewith.

Upon the bolt a nut 17 is mounted, this nut having a cylindrical body portion 18 from opposite sides of which and at the outer end of the nut project diametrically opposed wing flanges 19. The wing slots 16 are of such size that when the nut is aligned therewith, the lug 15 may be removed thereover and the wings 19 are further of such size that they do not in any position of the nut project into the path of the rim 11 in its removal. In combination with this structure, I provide a washer 20 having a central opening 21 of slightly greater diameter than the cylindrical body portion 18 of the nut. The washer has formed therein diametrically opposed wing slots 22 corresponding to the wing slots 16 of the lug and the wings 19 of the nut and permitting placement of the washer against the lug over the nut. Adjacent opposite side edges of the wing slots 22 of the washer upon the outer face thereof are formed projecting lugs 23, these lugs being so positioned that they are engaged by the wings of the nut during rotation of the nut in a direction to tighten the same and prevent the wings of the nut from coming into alignment with the wing slots 22 of the washer, the washer rotating with the nut. In loosening the nut, however, the wings of the nut engage the lugs 23 when these wings are aligned with the wing slots 22 so that it is merely necessary to loosen the nut 17 sufficiently to remove all strain therefrom when the washer may be grasped by the hand and drawn directly from the bolt over the nut. With the washer removed, the nut may be aligned by the fingers with the wing slots 16 of the lug and the lug similarly removed. A special wrench having a bore 24 for the reception of the body of a nut and notches 25 for the reception of the wings of the nut will, of course, be desirable in tightening and loosening the nut.

It will be obvious that the construction hereinbefore set forth is obviously capable of a certain range of change and modification without materially departing from the spirit of the invention and I accordingly do not limit myself to such specific structure except as hereinafter claimed.

I claim:—

1. In combination with a felly and demountable rim mounted upon the felly, a lug for retaining the rim in position upon the felly, a bolt extending through the felly and lug, a nut engaging the bolt, a washer disposed between the nut and lug, said washer and lug being each removable over the nut in one position of the nut with relation thereto when strain of the nut is removed therefrom, and means upon said washer automatically positioning the washer in said position as the nut is rotated to relieve strain thereon.

2. In combination with a felly and demountable rim mounted upon the felly, a lug for retaining the rim in position upon the felly, a bolt extending through the felly and lug, a nut engaging the bolt, a washer disposed between the nut and lug, said nut comprising a cylindrical body having diametrically opposed wings, said lug and washer each having an opening through which the bolt is directed of greater size than the body of the nut and having diametrically opposed wing slots for the passage of the wings of the nut.

3. In combination with a felly and demountable rim mounted upon the felly, a lug for retaining the rim in position upon the felly, a bolt extending through the felly and lug, a nut engaging the bolt, a washer disposed between the nut and lug, said nut comprising a cylindrical body having diametrically opposed wings, said lug and washer each having an opening through which the bolt is directed of greater size than the body of the nut and having diametrically opposed wing slots for the passage of the wings of the nut and means upon said washer engaged by the wing of the nut during rotation of the nut to relieve strain upon the washer and lug for maintaining the slots of the washer in alignment with the wings of the nut.

4. In combination with a felly and demountable rim mounted upon the felly, a lug for retaining the rim in position upon the felly, a bolt extending through the felly and lug, a nut engaging the bolt, a washer disposed between the nut and lug, said nut having projecting portions, said washer and lug each having an opening corresponding in shaping to the shaping of the nut whereby they are removable over the nut and means upon said washer limiting relative rotation of the nut and washer maintaining the projecting portions of the nut out of alignment with the corresponding portions of the openings of the washer during tightening of the nut.

5. In combination with a felly and demountable rim mounted upon the felly, a lug for retaining the rim in position upon the felly, a bolt extending through the felly and lug, a nut engaging the bolt, a washer disposed between the nut and lug, said nut having projecting portions, said washer and lug each having an opening corresponding in shape to the shape of the nut whereby they are removable over the nut and means upon said washer limiting relative rotation of the nut and washer maintaining the projecting portions of the nut out of alignment with the corresponding portions of the openings of the washer during tightening of the nut, and aligning said projecting portions with the corresponding portions of the opening during loosening of the nut.

In testimony whereof I hereunto affix my signature.

ALBERT F. VURPILLAT.